Patented Dec. 10, 1929

1,739,460

UNITED STATES PATENT OFFICE

GEORGE B. HINTON, OF MEXICO, MEXICO

CELLULAR FABRIC

No Drawing.   Application filed January 10, 1929. Serial No. 331,715.

The invention relates to a novel product in the form of a cellular fabric comprising a body of adherent bubbles each having a thin rigid envelope of set hydraulic cement, the fabric including bubbles of substantially uniform size, or bubbles of different sizes in which the larger bubbles are surrounded by and substantially encased or enveloped by bubbles of smaller size, the fabric in its broader aspects being the product of the method disclosed in my prior Patent No. 1,657,716, dated January 31, 1928. As set forth in the patent aforesaid, the method produces a cementitious material of cellular structure which is produced by agitating and aerating a mixture of hydraulic cement and water, to which is added a relatively small quantity of a frothing flotation reagent, the aeration of the mixture being brought about by breaking up air forced into the mixture into bubbles which are uniformly distributed throughout the mixture and which, because of the presence of the flotation reagent, take on a sheath or envelope of cement, the cement coated bubbles eventually rising to the top of the mixture and collecting to form a froth of mutually adherent bubbles, which may be cast into molds or formed into the desired shapes by other means, so that the final product is in the form of a fabric of cellular structure in which the unit cells are mutually adherent shells of set hydraulic cement.

The patent aforesaid, while covering the method or process broadly, exemplifies the application of the same with hydraulic cements of relatively low grades of fineness indicating within certain stated limits the proportions of water and cement in the grout employed, and it has been found that with the finer grades of cement, more particularly those which have been ground to such a degree of fineness that as high as 98% will pass through a 200 mesh screen, the proportions of water used may be largely increased, so that the specific gravity of the ultimate product may be varied within relatively wide limits without impairing the inherent strength of the product.

For example, in practicing the method as described in my patent aforesaid employing hydraulic cement, of which 84% will pass through a 200 mesh screen, it has been found possible to produce the cellular fabric having a specific gravity of 0.5, employing 45% by weight of water, and a similar fabric having a gravity of 0.3 using 60% of water. It has been found that cement of this texture is so coarse that only about 60% or 70% of it reacts to the flotation oil and the remainder, in the form of sand-like grains of cement clinker, is merely carried along with the fine material in the process. In other words, from 30% to 40% of the cement is relatively inert and is not affected by the water. In using the method with more finely and more uniformly ground cements, as stated, the proportion of water to form a grout may be very largely increased and it has been found that, when working with "Ferrocrete", which is a hydraulic cement of such fineness that 98.05% will pass a 200 mesh screen, anywhere from 60% to 90% of water, by weight, may be employed in making up the grout and will produce a very excellent cellular fabric having a predetermined specific gravity.

It has also been found that certain additions of cheaper material to the grout may be made, which will reduce the cost and at the same time add valuable properties to the product, but, in such case, the added material must be supplemented or accompanied with an additional and characteristic quantity of water. For example, in order to make a light weight product in which each 100 pounds of the mixture consisting of 70% "Ferrocrete", 20% of raw mix, 5% of lime, and 5% of kieselguhr, we would have

| | Pounds water |
|---|---|
| 70 lbs. "Ferrocrete" require 90% water equal to | 63 |
| 20 lbs. raw mix require 90% water equal to | 18 |
| 5 lbs. lime require 200% water equal to | 10 |
| 5 lbs. kieselguhr require 300% water equal to | 15 |
| Total water | 106 |

This exemplary grout mixture, when aerated and agitated in the presence of a small quantity of a flotation reagent, will produce a froth of fine consistency, which will ultimately set up into a rigid mass consisting solely of mutually adherent shells formed by hydraulic cement associated with the other elements.

In a companion application filed of even date herewith, there is shown and described an exemplary apparatus or plant for carrying out the method in its various phases, including the manufacture of fabric having cells all of substantially the same uniform size, or a fabric having cells of varying sizes, in which the larger cement coated bubbles are substantially surrounded and encased by the smaller cement coated bubbles, so that the fabric may be identified as unicellular, bicellular or multicellular, depending upon the size and characters of the bubbles or cells.

As described in my patent aforesaid and in the application referred to, the preliminary grout of cement and water is preferably prepared by mixing the predetermined weights of cement and water, the latter preferably having been saturated with cement, so that the resultant grout will consist of the cement with or without additional material suspended and evenly distributed throughout the water and in the best possible condition to be acted upon by the flotation medium or reagent, which latter may be of any of the particular forms mentioned in the patent aforesaid, but which, for very effective results, is preferably a saturated solution of thiocarbanalid in orthotoluidine, plus colloidal rosin, the amount of the first ingredient being 0.2% and of the latter 0.75% of a 5% solution of the weight of the hydraulic cement employed in the grout or pulp. This seems to form an ideal combination, in that the flotation reagent involves not only the necessary frothing action, when agitated, but also exercises a collecting reaction in respect of the cement.

As a concrete example of the preliminary mixture of hydraulic cement grout and the flotation reagent, a charge consisting of 10 kilos of standard cement with the requisite quantity of water (4 to 5 liters) would require 75 cc. of a 5% solution of colloidal rosin, 20 cc. of the orthotoluidine and thiocarbanalid mixture, to which may be applied, if desired, 500 grams of fine sawdust moistened with 2.0 liters of water, the use of the sawdust being optional and, in some cases, indicating a decided beneficial result in the ultimate product.

The grout with the addition of the flotation reagent is thoroughly mixed to homogenize the same, the mixing being effected in a suitable apparatus, as, for example, the mixing buckets described in my application aforesaid. If it is desired to produce a bicellular fabric, the homogenized mixture of grout and flotation reagent is fed continuously into a preliminary aerating machine or creamer, such as described in the application aforesaid, to which the requisite air is supplied and the air with the grout mixture beaten up into a froth of cream-like consistency comprising very fine bubbles, which cream is fed to the frother where it is supplied with an additional component of air, which is subdivided into relatively large bubbles and distributed, by the agitating devices in the frother, uniformly throughout the mixture, so that there is formed within the body of the mixture a mass of relatively large bubbles surrounded by the relatively small bubbles formed in the creamer, the spumous mass which is ultimately discharged by one of the outlets provided for the purpose and delivered to the molds or other devices by means of which the spumous mass is given its ultimate form.

In making a unicellular fabric, in which the cells or bubbles are of substantially uniform size, the admixture of the grout with the flotation reagent is delivered to the frother, which is supplied with air in relatively thin streams, the air being subdivided into bubbles of the desired size, which latter is determinable largely by the speed of operation of the cutter device usually employed with the frother, and the bubbles uniformly distributed throughout the body of cement pulp by the mixing devices, so that the ultimate product in the form of a froth or spumous mass of cement coated bubbles of substantially uniform size, is discharged from the frother and delivered to the molds or other forming devices as hereinbefore indicated.

Instead of producing the spumous mass of relatively small bubbles in the creamer and passing the same into the frother and admixing large bubbles of air therewith in the frother, it will be apparent that the same product may be formed by first making a froth of relatively small bubbles, then a second froth of relatively large bubbles and uniformly mixing the two sizes of bubbles, so that the smaller bubbles will surround and practically encase the larger bubbles.

What I claim is:

1. A cellular fabric comprising a body of adherent bubbles, each having a rigid envelope of set hydraulic cement the walls of the individual envelopes being of substantially uniform thickness.

2. A cellular fabric comprising a body of adherent bubbles, each having a thin rigid envelope of set hydraulic cement.

3. A cellular fabric comprising a rigid spumous mass of mutually adherent shells of set hydraulic cement the walls of the individual shells being of substantially uniform thickness.

4. A cellular fabric comprising a rigid spumous mass of mutually adherent shells of set hydraulic cement of large and small size, the large size shells being surrounded by those of smaller size.

In testimony whereof I affix my signature.

GEORGE B. HINTON.